(No Model.)

F. H. RICHARDS.
WEIGHING MACHINE.

No. 570,302.

4 Sheets—Sheet 1.

Patented Oct. 27, 1896.

Witnesses:
J. L. Edwards Jr.
Fred. J. Dole.

Inventor:
F. H. Richards.

(No Model.)
4 Sheets—Sheet 2.

F. H. RICHARDS.
WEIGHING MACHINE.

No. 570,302.  Patented Oct. 27, 1896.

Witnesses:
J. L. Edwards Jr.
Fred. J. Dole.

Inventor:
F. H. Richards (No Model.)  4 Sheets—Sheet 3.

F. H. RICHARDS.
WEIGHING MACHINE.

No. 570,302.  Patented Oct. 27, 1896.

Witnesses:
J. L. Edwards, Jr.
Fred. J. Dole.

Inventor:
F. H. Richards.

(No Model.) 4 Sheets—Sheet 4.

F. H. RICHARDS.
WEIGHING MACHINE.

No. 570,302. Patented Oct. 27, 1896.

Witnesses:
J. L. Edwards, Jr.
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 570,302, dated October 27, 1896.

Application filed July 14, 1896. Serial No. 599,075. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object of the invention being to provide an improved organization of mechanism comprehending efficient load-supply means, more especially intended for application to machines for weighing certain classes of sluggish materials—such as coffee, flour, and substances possessing similar characteristics.

Figures 1, 6, 7, 8, 9:
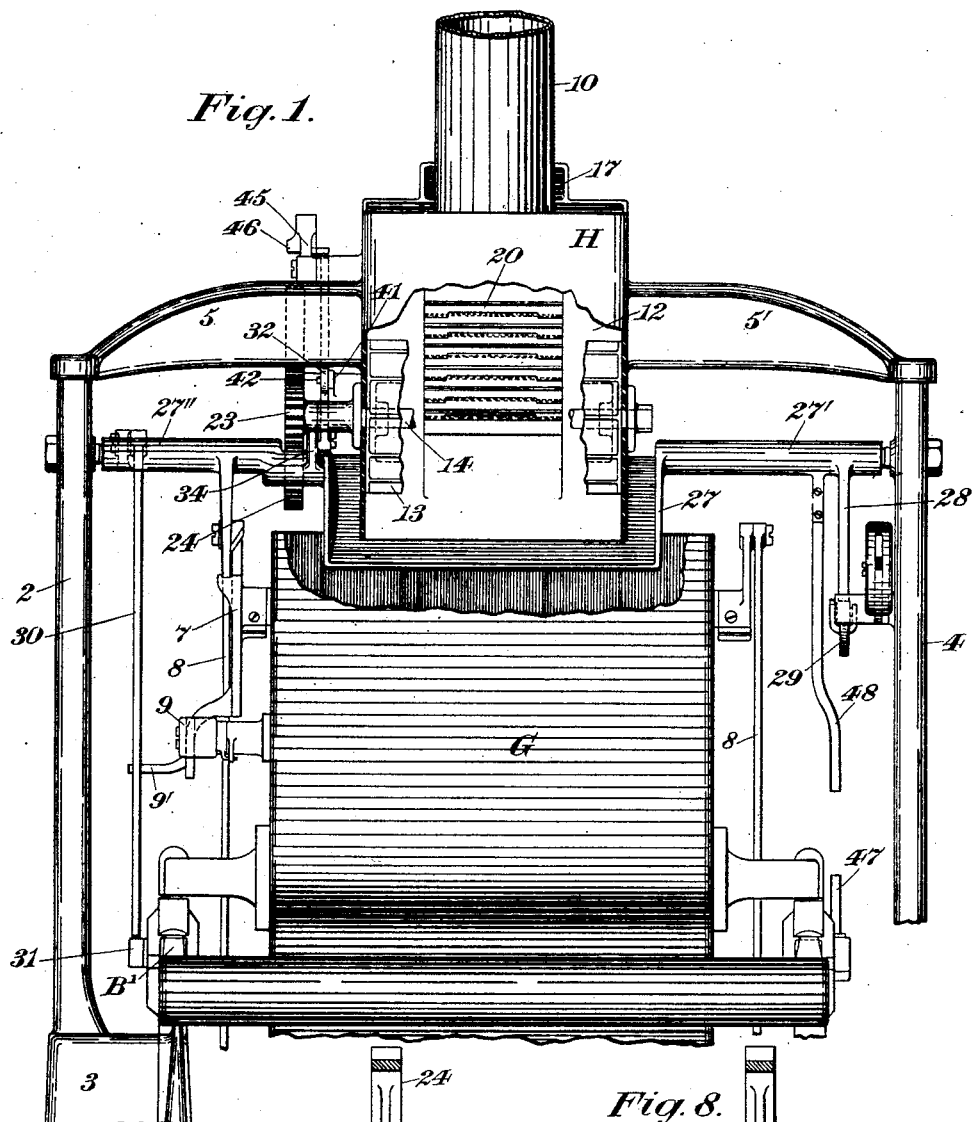
Figure 2:
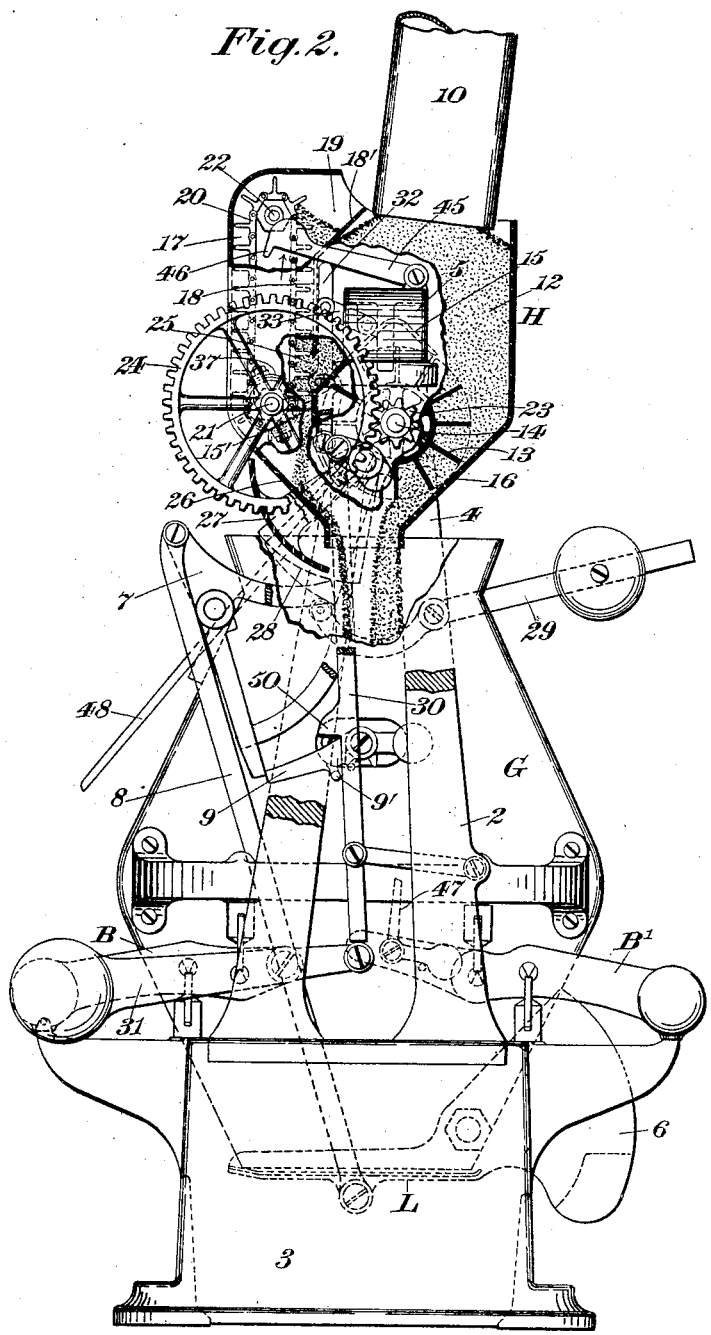
Figure 3:
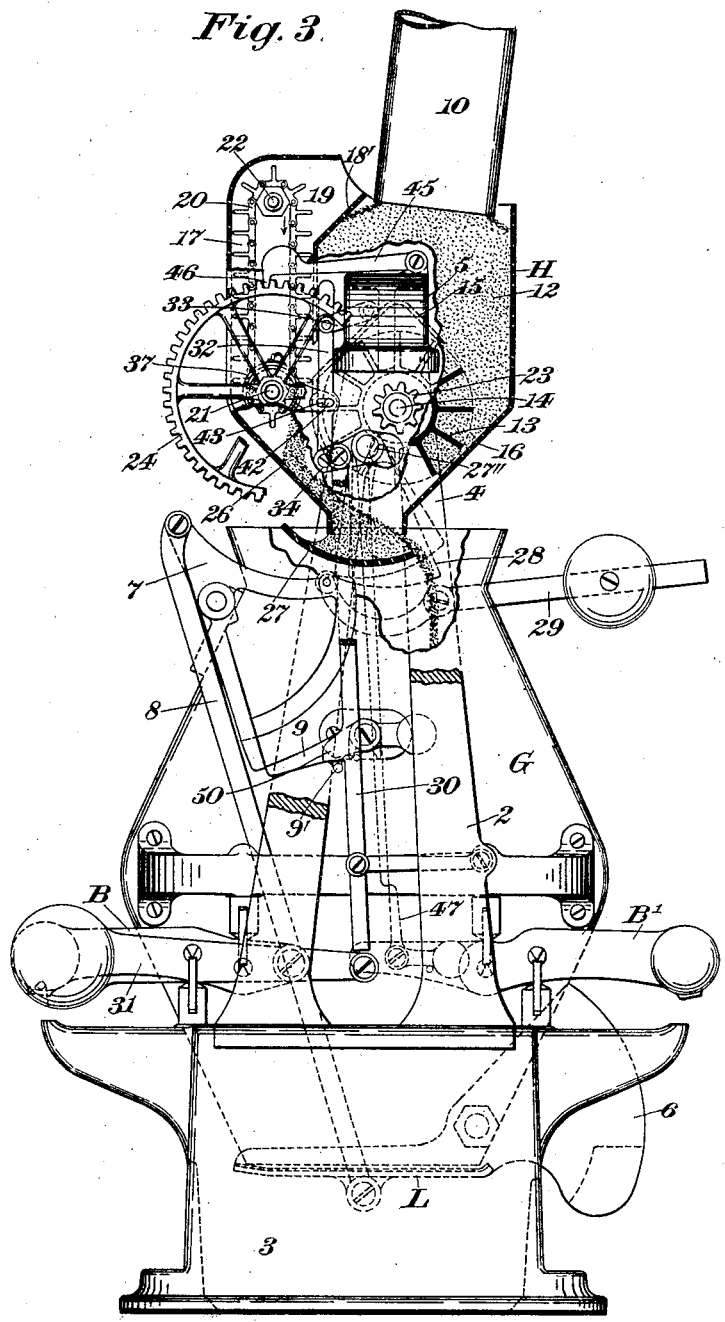
Figure 5:
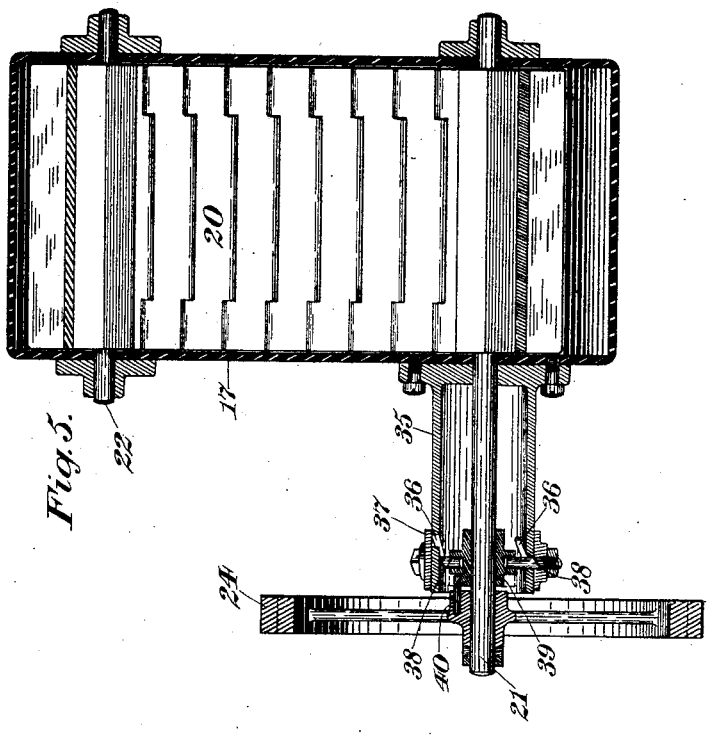
Figure 4:
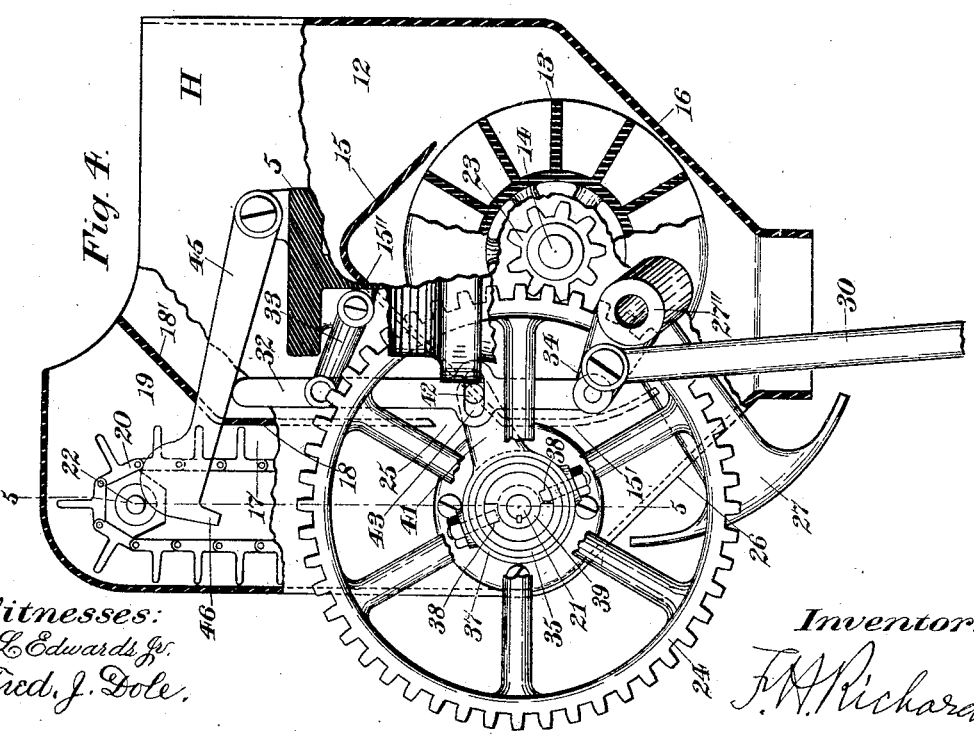

In the drawings accompanying and forming part of this specification, Figure 1 is a front elevation of the principal parts of a weighing-machine embodying my present improvements in the preferred form thereof. Fig. 2 is an end elevation as seen from the left in Fig. 1, and illustrates the positions occupied by the respective operative parts at the commencement of operation, portions being broken away to illustrate more clearly certain peculiar features of the invention. Fig. 3 is a similar view illustrating the positions of said parts at the commencement of the poising period. Fig. 4 is an end elevation, on an enlarged scale, of the load-supply means, a section of the supply-hopper being removed to show more clearly the interior organization thereof. Fig. 5 is a vertical section on the line 5 5, Fig. 4. Figs. 6, 7, 8, and 9 are details to be hereinafter more particularly described.

Similar characters designate like parts in all the figures of the drawings.

The weighing mechanism may be of any suitable or preferred type, and for convenience in illustrating the nature of my present improvements that shown herein is substantially similar in construction and mode of operation to the improved weighing mechanism disclosed in Letters Patent No. 548,840, granted to me October 29, 1895, to which reference may be had.

The framework for supporting the various parts of the machine may be of any suitable character, and it is herein shown consisting of the end frames or columns 2 and 4, mounted upon the chambered supporting-base 3.

A supply hopper or chute, to be hereinafter more particularly described, is shown at H, and is furnished with the lateral brackets or extensions 5 and 5', which may be suitably fastened to the end frames 2 and 4. The bucket or weigher is designated by G, and for supporting the same the beam mechanism, consisting of the counterweighted scale-beams B and B', fulcrumed on the base 3 in the manner disclosed in the hereinbefore-mentioned Letters Patent, will be employed, and will be also provided with the usual bucket-supports for sustaining the bucket, as also set forth in said Letters Patent.

The closer for the bucket is designated by L, and consists of an approximately flat plate provided with counterweighted end plates, as 6, pivoted to the end walls of the bucket, their office being to return said closer to its normal or shut position on the discharge of the bucket load.

For supporting the closer L, the rocker 7, pivoted to the bucket G, and the connecting-rod 8, jointed to said rocker and to the closer, are herein illustrated, said rocker being in position to be engaged by the counterweighted bucket-latch 9 when said closer is in its normal or shut position. The latch 9 swings upward to engage the rocker, and on its disengagement therefrom it will be evident that said rocker, and hence the connected bucket-closer, will be free of restraint, so that the latter may be forced open by the weight of the contents of the bucket.

For supplying the bucket or weigher G with a stream or streams of material, the supply apparatus illustrated may be employed and involves a suitable hopper—for example, that shown at H—a power-transmitting member driven by a gravitating mass or body of material passing through said hopper, and a drip-supply device actuated by said power-transmitting member, by virtue of which organization the machine is particularly adapted for weighing certain classes of materials, and the expense of operating the same is reduced to a minimum.

A supply pipe or conduit is shown at 10, it communicating with a suitable source of supply and being adapted for delivering a stream of material to the main compartment or chamber 12 of the hopper II.

The power-transmission member is shown herein as a bucket-wheel 13, supported for rotary movement within the main compartment 12, it consisting of a suitable hub having a series of radial blades projecting therefrom, said hub being keyed or otherwise attached to the supporting-shaft 14, which latter is suitably journaled in the end walls of the hopper II.

A deflecting or baffle plate is shown at 15, being preferably of an inverted V shape. The supply-pipe 10 is set at an angle to the hopper II, and on the downflow of a stream or body of material therefrom it will strike with some force the plate 15 and will be directed to what is shown as the "right," and on its continued descent, acting against the blades of the bucket-wheel 13, it will rotate the same, and as the mass or stream leaves the wheel will pass to the inclined wall 16 of the hopper II, from whence it gravitates through the supply aperture or opening of said hopper and into the bucket G, such supply constituting the main stream, its purpose being to furnish the major part of or nearly complete the bucket load.

A drip-compartment is shown at 17, formed by the vertical portion 15' of the baffle-plate 15 and the septum or partition 18, in which is operative a drip-supply device, which is actuated by the bucket-wheel 13, said drip-compartment 17 being widened out at its top, as at 19, to form a drip-storage chamber for the accumulation of the drip. The partition 18 is shown inclined at 18', for a purpose that will hereinafter appear.

The drip-supply device, which is designated by 20, is in the nature of a combined elevator and feeder, having two movements, one for elevating a supply of material to the drip-storage chamber 19, and having a reverse movement for conducting said material into the bucket in the form of a drip-stream to complete the partial load therein. The drip-supply device 20 in the form shown consists of a sprocket-chain, each of the links of which is provided with a float or conveyer member, which serves its well-known function. Said chain will be loosely passed around the hexagonal supporting-shafts 21 and 22, the first mentioned of which constitutes the actuating-shaft, it being driven by the power-transmission device or bucket-wheel 13. The bucket-wheel shaft 14 is shown carrying the relatively small pinion 23, which meshes with the large gear 24, which latter is normally coupled or clutched to the main shaft 21 of the drip-supply device, so that on the rotation of the bucket-wheel 13 in the manner previously described the pinion 23 and the meshing-gear 24 will be rotated and the drip-supply device 20 moved in the direction of the arrow in Fig. 2, whereby a supply of material flowing down the incline portion 15" of the plate 15 may pass through the supply or feed opening 25 and to the blades of the drip-supply device 20, said material being elevated by the latter and discharged into the drip-storage chamber 19.

At a predetermined point in the operation of the machine the drip-supply device 20 will be released or unclutched from its supporting-shaft and will be reversely operated by the supply of drip which gravitates downward from the inclined portion 18' of the partition 18, and, acting against the blades of the drip-supply device 20, will force the same downward, and as said blades approach the outer run the material will drop therefrom and to the inclined wall 26 of the hopper, from whence it flows into the bucket G.

The blades of the bucket-wheel 13, it will be obvious, run approximately in contact with the inclined wall 16 of the chute or hopper II, so that on the stoppage or throwing of the bucket-wheel out of action it serves as an effective cut-off medium for preventing any of the material from the main compartment 12 from entering the then loaded bucket.

On the completion of the bucket load it is desirable to project a valve across the mouth or supply-outlet of the hopper II, for the purpose of catching any excess of material that may descend from the drip-supply device 20. The movement of the drip-supply device and the bucket-wheel which operates the same will be preferably controlled or governed by some reciprocatory member of the weighing mechanism, as said valve, as will hereinafter appear.

The valve or cut-off is designated by 27 and is of the "pan" type, it being supported for oscillatory or swinging movement beneath the supply-outlet of the hopper II and preferably formed integral with a two-part supporting-shaft, consisting of the members 27' and 27", the latter being provided with bearings in the outer ends for receiving suitable journals carried by the framing of the machine.

For alternately closing and opening the valve 27, actuating mechanism substantially similar in construction and mode of operation to that shown and described in the Letters Patent hereinbefore referred to is illustrated, and which it is deemed unnecessary to describe in detail.

A rigid valve-closing cam is shown at 27' depending from the valve-shaft section 28' and in position to receive a thrust from the counterweighted lever 29, which is pivotally supported on the framing of the machine for effecting the closure of said valve.

A relatively long connecting-rod is shown at 30 jointed to the valve-shaft section 27". A counterweighted lever is shown at 31 pivotally supported by an arm of the scale-beam B and shiftable about its axis in the manner disclosed in my said Letters Patent, and on its return stroke said counterweighted lever is operable for imparting an upward thrust to the connecting-rod 30, which in turn is transmitted to the valve 27 for forcing the same open.

The mechanism for uncoupling or unclutching the drip-supply device 20 from its actuating-shaft 21, and hence for throwing it out of operative relation with the power-transmitting member or bucket-wheel 13, will now be described. A vertically-reciprocating rod is shown at 32 connected by the guide-link 33 to the framing of the machine and also to the valve-shaft member 27" by the interposed rock-arm 34, projecting from said shaft member, so that on the closure of the valve 27, as will be evident, the rod 32 will be drawn downward. A flanged sleeve or collar is shown at 35, through the flange of which and a wall of the hopper suitable fastening means may be passed to hold said part in place. The said flange or collar 35 is disposed about the extended end of the actuating-shaft 21 and incases a suitable clutch, which in the present instance is of the "pin" type.

The sleeve or collar 35 is furnished with the oblique cam-slot 36, the purpose of which will now appear, and is shown embraced by the rotary annular band or ring 37, through a suitable aperture in which a clutch actuator or pin 38 extends and between the walls of a channel or groove in the movable clutch member 39, which latter is splined to the shaft 21. The complemental clutch member is shown at 40 as a pin or stud projecting laterally from the hub of the gear 24 and into an aperture formed in the body of the movable clutch member 39. The gear 24 is loose on the shaft 21, and it will be evident that when the pin 40 is seated in the aperture of the clutch member 39 the latter will be rotated by and with the gear 24, such motion in turn being imparted to the drip-supply device 21 for elevating a mass of material from the main compartment 12 of the hopper H to the drip-storage chamber 19 thereof. When the clutch member 39 has been moved inward along the shaft 21 for a sufficient distance, it will have passed the plane of action of the pin 40, the result being a throwing of the drip-supply device 20 out of action or releasing it from its driving mechanism. When this takes place, the accumulated material in the drip-storage chamber 19 is free to gravitate down the inclined portion 18' of the partition 18 and against the inner blades of the drip-supply device 20, forcing them downward by gravity, and as said blades approach the opposite run the material thereon will drop to the inclined wall 26 of the hopper H, from whence it passes into the bucket.

A crank-arm is shown at 41 extending from the body of the rotary band 37, and is provided at its outer end with a pin 42, which passes through the longitudinal slot 43, formed in the vertically-reciprocative rod 32 at a point intermediate its extremities.

The valve 27 being open, a body of material may gravitate from the main chamber 12 of the supply-hopper H through the outlet thereof and into the bucket, and during such course the material will operate the bucket-wheel 13. When a certain quantity of the material has been received by the bucket, it will descend, such action permitting a closure of the valve 27 by the counterweighted arm 29. As the valve closes the rod 32 will be drawn downward by virtue of its connection therewith, and the wall of the slot 43, impinging against the pin 42 on the crank-arm 41, will revolve or turn said crank-arm, and hence rotate the band 37, which carries the clutch-actuator 38. On the continuation of such rotary movement of said band 37 the pin 38 will be guided inward by the cam-slot 36, said pin moving the clutch member 39 away from its mate 40, so that at the commencement of the poising or drip period the two clutch members will be uncoupled, as illustrated in Fig. 8, thereby releasing the drip-supply device 20, whereby it may be operated by the gravitating material which descends from the drip-storage chamber 19 in the manner previously described.

When the drip-supply device is thrown out of operative relation with the power-transmision member 13, it is desirable to block the further movement of the latter, and for this purpose the means herein illustrated may be employed.

A locking device or detent is shown at 45 in the form of a counterweighted lever pivotally supported by the framing of the machine, and having the tooth 46, which may be thrust between the teeth of the gear 24, as indicated in Fig. 3. The detent device 45 is normally held in its ineffective position, as illustrated in Fig. 2, by the reciprocating rod 32, which also checks its descending movement. As said rod descends in the manner previously described, said detent will be caused to move in unison therewith by virtue of its counterweight, so that about the time the drip-supply device 20 is uncoupled from its actuating-shaft 21 the tooth 46 will be thrust between the teeth of the gear 24, and the further rotation of the latter, and hence that of the bucket-wheel 13, will be arrested, whereby said bucket-wheel on its stoppage may cut off the supply of material from the main hopper 12.

At about the time the drip-supply device 20 is being reversely operated for supplying the drip stream to the bucket the further progress of the valve 27 will be intercepted, and for this purpose the means illustrated may be employed. A by-pass device is shown at 47 in the form of a counterweighted angle-lever pivotally supported upon the scale-beam B', the vertical arm of which is in position to engage the depending rod 48 of the valve-shaft member 27'. When such action takes place, the movement of the by-pass device 47 will be suitably limited. On the completion of the bucket load by the drip-stream from the drip-supply device 20 the bucket and the beam mechanism will pass below the poising line, the by-pass 47 moving therewith and releasing the depending rod 48 and hence the valve 27, so that the latter may be imparted its final closure to catch the gravitating particles from the drip-supply device 20.

For depressing the bucket-latch 9 a latch-tripper or projection is shown at 50, formed on the connecting-rod 30, and having a movement into engagement with the latch-pin 9' on the final stroke of the valve 27, to thereby depress said latch and release the rocker 7 and also the bucket-closer L, so that the latter may be forced open by the weight of the contents of the bucket to discharge the same.

The operation of the hereinbefore-described machine is as follows: Fig. 2 represents the positions occupied by the coöperative parts at the commencement of operation, the closer L being locked in its normal position by the latch 9, which is in engagement with the rocker 8, and the valve 27 being open. The mass of material from the supply-pipe 10 will gravitate therefrom and against the deflecting-plate 15, by which it is directed against the blades of the bucket-wheel 13, thereby rotating the latter, such material passing to the inclined wall of the chute H through the aperture thereof in the form of a main stream and into the bucket G. On the rotation of the bucket-wheel 13 the drip-supply device 20 will be operated through the interposed gears 23 and 24 for elevating a body of material to the chamber 19. When a certain proportion of the load has been received by the bucket, it will descend, thereby permitting the closure of the valve. As the valve closes the rod 32 will be drawn downward thereby, and through the intervention of its operative connections with the movable clutch member 39 will uncouple the latter from its mate 40, this action taking place at about the commencement of the poising period, so that the drip-supply device 20 is thereby thrown out of operative relation with the power-transmitting member 13, and approximately concurrently therewith the tooth 46 of the detent 45 will be thrust between the teeth of the gear 24, thereby blocking the rotation of the same, the meshing-gear 23, and the bucket-wheel 13, the further progress of the valve 27 at this time being arrested by the by-pass 47, which engages the depending valve-rod 48. The drip-supply device 20 is then reversely operated by the descending drip material from the storage-chamber 19, such material being conducted to the bucket G for completing the partial load therein. On the completion of the bucket load, the bucket, the beam mechanism, and the by-pass 47 will move below the poising line, thereby releasing the valve 27, so that it may be imparted its final closing movement by the counterweighted lever 29. When the valve 27 has nearly reached the end of its cut-off stroke, the projection 50 will engage the latch-pin 9', thereby depressing the latch 9 and releasing the bucket-closer L.

Having thus described my invention, I claim—

1. The combination with a hopper, of a power-transmitting member driven by a gravitating mass of material passing through said hopper, and a device for storing a drip supply actuated by said power-transmitting member.

2. The combination with a hopper, of a rotary power-transmitting member driven by a gravitating body of material passing through said hopper, and a device for storing a drip supply actuated by said power-transmitting member.

3. The combination with a hopper, of a power-transmitting member located therein and driven by a gravitating mass of material passing through said hopper, and a device for storing a drip supply actuated by said power-transmitting member.

4. The combination with a hopper, of a power-transmitting member driven by a gravitating mass of material passing through said hopper; a drip-supply device; and operative connections between the latter and said power-transmitting member.

5. The combination with a hopper, of a power-transmitting member and its supporting-shaft, said member being driven by a gravitating mass of material passing through said hopper; a drip-supply device and a supporting-shaft therefor; and a pair of meshing gears carried by said shafts.

6. The combination with a weigher, of a hopper; a power-transmitting member driven by a gravitating mass of material passing through said hopper; and a device for storing a drip supply actuated by said power-transmitting member.

7. The combination with a hopper, of a bucket-wheel driven by a gravitating mass of material passing through said hopper, and a device for storing a drip supply actuated by said bucket-wheel.

8. The combination with a hopper, of a bucket-wheel located therein and driven by a body of material passing through said hopper; an adjacent device actuated thereby; and means for throwing said bucket-wheel out of action, whereby it constitutes a stream cut-off.

9. The combination with a hopper having a storage-chamber, of a power-transmitting member, and a drip-supply device actuated by the latter and operative for elevating a body of material to said storage-chamber.

10. The combination with a hopper, of a power-transmitting member; and a combined drip elevator and feeder having movements in two directions, it being operated in one direction by said power-transmitting member and n the opposite direction by the material passing from the hopper.

11. The combination with a hopper, of a power-transmitting member, a combined drip elevator and feeder having a movement in two directions, being operated in one direction by said power-transmitting member and in the other by a supply of drip material thereon.

12. The combination with a hopper having a storage-chamber, of a drip-supply device; means for operating the same in one direction; and means for throwing said drip-supply device out of operative relation with its operating means, whereby it may be reversely driven by a gravitating body of material from said storage-chamber.

13. The combination with a hopper, of a power-transmitting device; a drip-supply device; operative connections between the latter and said power-transmitting device, whereby said drip-supply device is caused to store material in a chamber of the hopper; and means for blocking the movement of one of said devices.

14. The combination with a hopper, of a power-transmitting member driven by a body of material passing from said hopper; a drip-supply device; operative connections between said drip-supply device and said power-transmitting member; and means of blocking the movement of the drip-supply device, whereby the power-transmitting member will also be held stationary.

15. The combination with a power-transmitting device, of a drip-supply device; actuating-gearing interposed between said devices; a detent in position to be thrust between the teeth of one of the gears; and means for normally holding said detent in an ineffective position.

16. The combination with a hopper, of a bucket-wheel located therein; a drip-supply device also located in said hopper; and operative connections between the latter and the bucket-wheel.

17. The combination with a hopper having a drip-storage chamber, of a bucket-wheel located in said hopper; a drip-supply device also located therein and having two movements, on one of which it is adapted for elevating a body of material to said drip-storage chamber; and operative connections between said bucket-wheel and the drip-supply device for moving the latter in one direction; said device being moved in the opposite direction by material passing from the storage-chamber.

18. The combination with a hopper, of a bucket-wheel located in said hopper and driven by a body of material passing therethrough; a deflecting-plate located over said bucket-wheel; and a device for storing a drip supply actuated by said bucket-wheel.

19. The combination with a hopper having main and drip compartments, of a bucket-wheel located in said main compartment, and a device for storing a drip supply located in the other compartment and actuated by said bucket-wheel.

20. The combination with a hopper having main and drip compartments separated by a partition having an inclined portion, which latter forms with a wall of the chute a drip-storage chamber; of a bucket-wheel located in said main compartment and driven by a body of material passing through the hopper; a drip-supply device located in the other compartment; connections between the latter and the bucket-wheel for operating said drip-supply device in one direction; means for releasing said drip-supply device from its actuating mechanism, whereby it may be reversely operated by a body of material gravitating from said storage-chamber.

21. The combination with weighing mechanism embodying a bucket, of a hopper; a power-transmitting device driven by a body of material passing through said hopper; a device for storing a drip supply actuated by said bucket-wheel; and controlling means for one of said devices operative with the weighing mechanism.

22. The combination with weighing mechanism embodying a bucket and a valve, of a hopper; a bucket-wheel driven by a body of material passing through said hopper; a device for storing a drip supply actuated by said bucket-wheel; and controlling means for one of said devices operative with said valve.

23. The combination with weighing mechanism embodying a bucket, of a hopper; a bucket-wheel driven by a body of material passing through said hopper; a device for storing a drip supply actuated by said bucket-wheel; and controlling means for said drip-supply device operative with the weighing mechanism.

24. The combination with a hopper having main and drip compartments, of a bucket-wheel located in said main compartment; a deflecting-plate disposed above said bucket-wheel; and a device for storing a drip supply actuated by said bucket-wheel.

25. The combination with a hopper having main and drip compartments, of a bucket-wheel located in said main compartment; a deflecting-plate disposed above said bucket-wheel; a device for storing a drip supply actuated by said bucket-wheel; and a supply-pipe leading into said hopper.

26. The combination with weighing mechanism embodying a bucket, of a hopper; a bucket-wheel and its supporting-shaft; a drip-supply device also provided with a shaft; meshing gears carried by said shafts; a detent in position to be thrust between the teeth of one of said gears; and means operative with the weighing mechanism for normally limiting the movement of said detent.

27. The combination with weighing mechanism embodying a bucket, of a hopper; a bucket-wheel and its supporting-shaft; a drip-supply device also provided with a shaft; meshing gears carried by said shafts; a counterweighted detent in position to be thrust between the teeth of one of said gears; and means operative with the weighing mechanism for normally limiting the movement of said counterweighted detent.

28. The combination with weighing mechanism, of a hopper; a power-transmitting member driven by a body of material passing through said hopper; a drip-supply device; operative connections, embodying a clutch, between the power-transmitting member and the drip-supply device; and means operative with the weighing mechanism for uncoupling the clutch members.

29. The combination with a hopper, of a power-transmitting member; a drip-supply device; operative connections, embodying a clutch, between the latter and the power-transmitting member; a sleeve disposed about said clutch and having a cam-slot; a rotary band on said sleeve provided with a clutch-actuator passing through said cam-slot; and means for rotating said band.

30. The combination with weighing mechanism, of a hopper; a power-transmitting member; a drip-supply device; operative connections, embodying a clutch, between the latter and the power-transmitting member; a sleeve disposed about said clutch and having a cam-slot; a rotary band having a clutch passing through said cam-slot and provided also with a crank-arm; and a reciprocating rod operative with the weighing mechanism and connected to said crank-arm.

31. The combination with weighing mechanism, of a hopper; a power-transmitting member driven by a body of material passing through said hopper; a drip-supply device; supporting-shafts for said members; meshing gears carried by said shafts; a clutch on one of the latter; a reciprocating rod connected to, and operable for uncoupling, the clutch members; and a detent in position to block the actions of one of the gears and normally held in its ineffective position by said reciprocating rod.

32. The combination with a hopper, of a bucket-wheel located therein and driven by a body of material passing through said hopper, the plates of said bucket-wheel running approximately in contact with a wall of said hopper; an adjacent device for storing a drip supply driven by said bucket-wheel; and means for throwing the said device out of action.

FRANCIS H. RICHARDS.

Witnesses:
FRED. J. DOLE,
HENRY BISSELL.